US012605944B2

(12) United States Patent
Kobayashi et al.

(10) Patent No.: US 12,605,944 B2
(45) Date of Patent: Apr. 21, 2026

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventors: Tetsuro Kobayashi, Chiryu (JP); Shuichi Tamaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/558,152

(22) Filed: Dec. 21, 2021

(65) Prior Publication Data

US 2022/0203720 A1 Jun. 30, 2022

(30) Foreign Application Priority Data

Dec. 28, 2020 (JP) ................................. 2020-218155

(51) Int. Cl.
*B41J 11/42* (2006.01)
*B41J 11/06* (2006.01)

(52) U.S. Cl.
CPC ................ *B41J 11/42* (2013.01); *B41J 11/06* (2013.01)

(58) Field of Classification Search
None
See application file for complete search history.

(56) References Cited

U.S. PATENT DOCUMENTS 8,820,874 B2 * 9/2014 Yanagishita ......... B41J 13/0009 347/104
2007/0188578 A1 8/2007 Kayanaka
2013/0050328 A1 2/2013 Yanagishita
2014/0333690 A1 11/2014 Yanagishita
2015/0251463 A1 9/2015 Yanagishita
2017/0232764 A1 8/2017 Mashima
2019/0009575 A1 1/2019 Mombourquette et al.

FOREIGN PATENT DOCUMENTS

JP 2007216502 A 8/2007
JP 2013047398 A 3/2013
JP 2014004707 A 1/2014
JP 2017140791 A 8/2017

OTHER PUBLICATIONS

Office Action issued in related Japanese Patent Application No. 2020-218155, dated Jan. 9, 2024. (3 pages.).

* cited by examiner

*Primary Examiner* — Alejandro Valencia
(74) *Attorney, Agent, or Firm* — HOGAN LOVELLS US LLP

(57) ABSTRACT

A printer is provided with a head, a platen, a conveyer, and a processor. The head performs printing on a print medium. The platen supports the print medium. The conveyer conveys the platen in a conveyance direction. The processor acquires a platen size. The platen size is a size of the platen in the conveyance direction. When the processor acquires a first platen size, the processor controls a conveyance operation of the platen such that a conveyance time period of the platen between a set position and a printing position is a first time period. When the processor acquires a second platen size, the processor controls the conveyance operation of the platen such that the conveyance time period of the platen between the set position and the printing position is a second time period different from the first time period.

13 Claims, 9 Drawing Sheets

PRINTER, CONTROL METHOD, AND NON-TRANSITORY COMPUTER-READABLE MEDIUM STORING COMPUTER-READABLE INSTRUCTIONS

CROSS-REFERENCE TO RELATED APPLICATION

This application claims priority to Japanese Patent Application No. 2020-218155 filed Dec. 28, 2020. The contents of the foregoing application are hereby incorporated herein by reference.

BACKGROUND

The present disclosure relates to a printer, a control method, and a non-transitory computer-readable medium storing computer-readable instructions.

A printer performs printing on a print medium placed on a platen, while conveying the platen in a sub-scanning direction. In this case, the platen is conveyed from a print medium set position to a stand-by position. The platen is conveyed back from the stand-by position to a reference position, and is further conveyed toward a printing position. The printing is performed at the printing position, and the platen is returned to the set position. The printer causes the reference position to be different in the sub-scanning direction in accordance with a size, in the sub-scanning direction, of the platen (hereinafter referred to as a "platen size").

SUMMARY

In the above-described printer, even when the reference position is shifted in the sub-scanning direction in accordance with the platen size, a distance in the sub-scanning direction between the set position and the printing position is constant, regardless of the platen size. Therefore, the conveyance time period of the platen between the set position and the printing position is constant, regardless of the platen size.

Embodiments of the broad principles derived herein provide a printer, a control method, and a non-transitory computer-readable medium storing computer-readable instructions, which are capable of causing a conveyance time period of a platen between a set position and a printing position to be different depending on a platen size.

A first aspect of the present disclosure relates to a printer including a head configured to perform printing on a print medium; a platen configured to support the print medium; a conveyer configured to convey the platen in a conveyance direction with respect to the head; a processor; and a memory storing computer-readable instructions that, when executed by the processor, cause the processor to perform processes comprising: acquisition processing of acquiring a platen size, the platen size being a size of the platen in the conveyance direction; and conveyance control processing that is processing to control a conveyance operation of the platen by the conveyer, the conveyance control processing including controlling the conveyance operation such that, when a first platen size is acquired by the acquisition processing, a conveyance time period of the platen by the conveyer between a set position of the print medium and a printing position is a first time period, the printing position being a position in the conveyance direction at which the head is provided, and controlling the conveyance operation such that, when a second platen size smaller than the first platen size is acquired by the acquisition processing, the conveyance time period of the platen by the conveyer between the set position and the printing position is a second time period different from the first time period.

According to the first aspect, the second time period is different from the first time period. Thus, the printer can cause the conveyance time period of the platen between the set position and the printing position to be different between when the first platen size is acquired and when the second platen size is acquired.

A second aspect of the present disclosure relates to a control method of a printer, the control method including: acquisition processing of acquiring a platen size, the platen size being a size, in a conveyance direction, of the platen that supports a print medium; and conveyance control processing that is processing to control a conveyance operation of the platen in the conveyance direction by a conveyer, the conveyance control processing including controlling the conveyance operation such that, when a first platen size is acquired by the acquisition processing, a conveyance time period of the platen by the conveyer between a set position of the print medium and a printing position is a first time period, the printing position being a position in the conveyance direction at which a head that performs printing on the print medium is provided, and controlling the conveyance operation such that, when a second platen size smaller than the first platen size is acquired by the acquisition processing, the conveyance time period of the platen by the conveyer between the set position and the printing position is a second time period different from the first time period.

The second aspect can achieve the same effects as those of the first aspect.

A third aspect of the present disclosure relates to a non-transitory computer-readable medium storing computer-readable instructions that, when executed, cause a computer of a printer to perform processes comprising: acquisition processing of acquiring a platen size, the platen size being a size, in a conveyance direction, of the platen that supports a print medium; and conveyance control processing that is processing to control a conveyance operation of the platen in the conveyance direction by a conveyer, the conveyance control processing including controlling the conveyance operation such that, when a first platen size is acquired by the acquisition processing, a conveyance time period of the platen by the conveyer between a set position of the print medium and a printing position is a first time period, the printing position being a position in the conveyance direction at which a head that performs printing on the print medium is provided, and controlling the conveyance operation such that, when a second platen size smaller than the first platen size is acquired by the acquisition processing, the conveyance time period of the platen by the conveyer between the set position and the printing position is a second time period different from the first time period.

The third aspect can achieve the same effects as those of the first aspect.

A fourth aspect of the present disclosure relates to a control method of a printer, the control method comprising: acquisition processing of acquiring a platen size, the platen size being a size, in a conveyance direction, of the platen that supports a print medium; decision processing, that is processing to decide, in accordance with the platen size acquired by the acquisition processing, a conveyance operation of the platen in the conveyance direction by a conveyer, the decision processing including deciding the conveyance operation such that, when a first platen size is acquired by the acquisition processing, a conveyance time period of the platen by the conveyer between a set position of the print medium and a printing position is a first time period, the printing position being a position in the conveyance direction at which a head that performs printing on the print medium is provided, and deciding the conveyance operation such that, when a second platen size smaller than the first platen size is acquired by the acquisition processing, the conveyance time period of the platen by the conveyer between the set position and the printing position is a second time period different from the first time period; and conveyance control processing of performing the conveyance operation decided by the decision processing.

The fourth aspect can achieve the same effects as those of the first aspect.

BRIEF DESCRIPTION OF THE DRAWINGS

Embodiments will be described below in detail with reference to the accompanying drawings in which.

DETAILED DESCRIPTION

Figure 1:
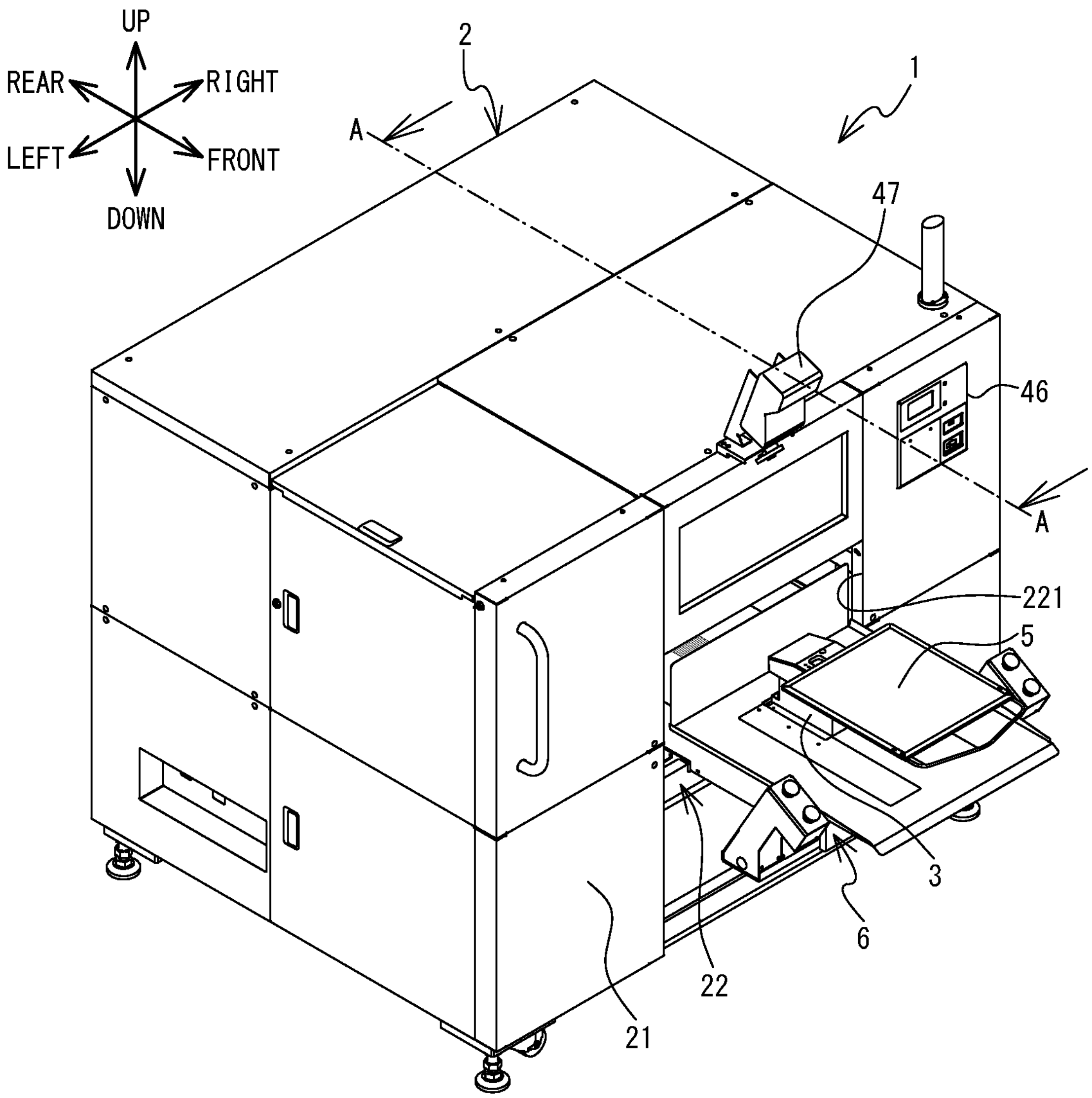
FIG. 1 is a perspective view of a printer as seen from the front left and above.

A printer 1 according to an embodiment of the present disclosure will be explained with reference to the drawings. The upper side, the lower side, the lower left side, the upper right side, the lower right side, and the upper left side in FIG. 1 are, respectively, an upper side, a lower side, a left side, a right side, a front side, and a rear side of the printer 1. In the present embodiment, mechanical elements in the drawings indicate an actual scale.

Figure 2:
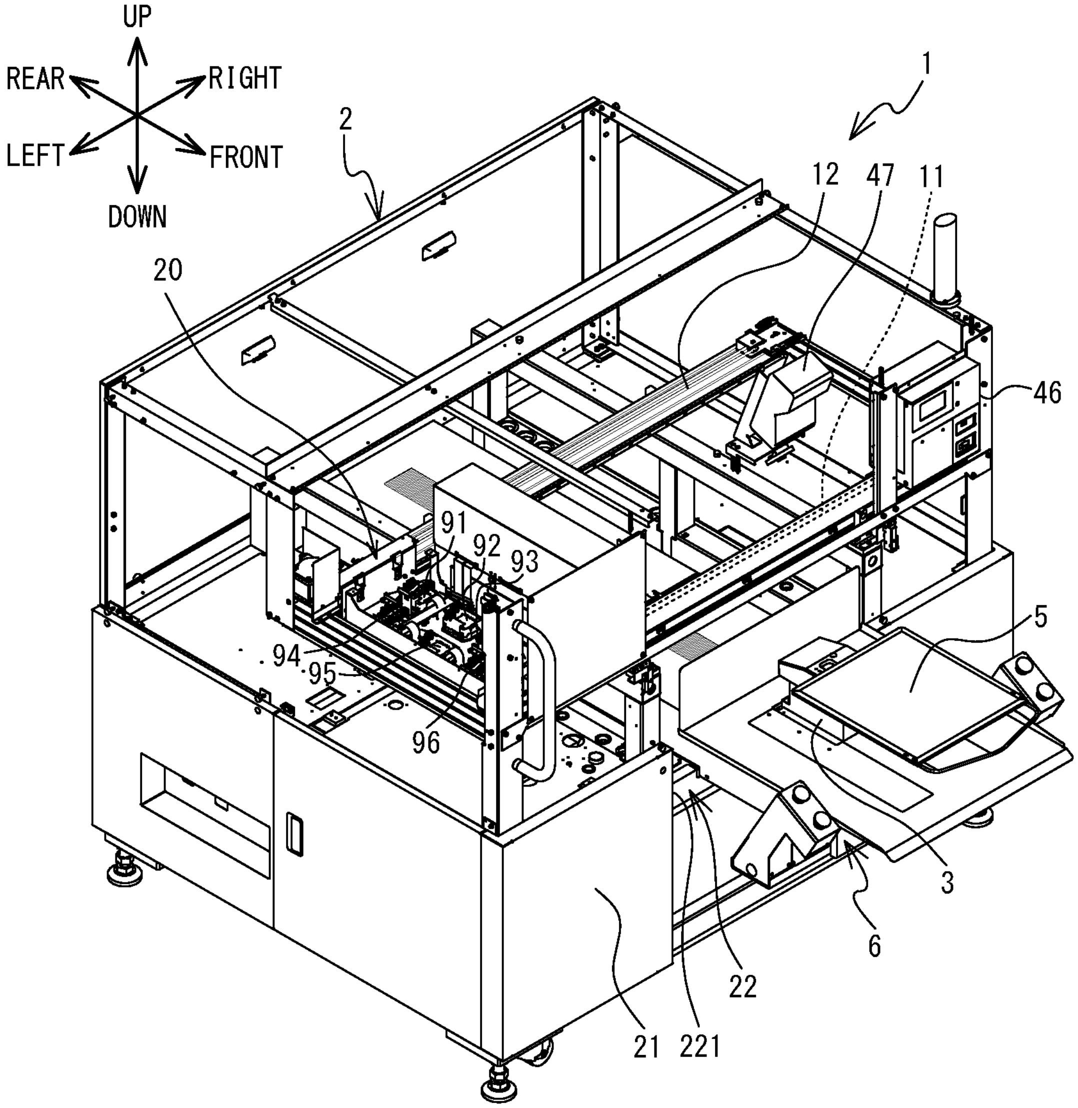
FIG. 2 is a perspective view of the printer as seen from the front left and above, without an upper portion of a housing.

An overall configuration of the printer 1 will be explained with reference to FIG. 1 to FIG. 3. As shown in FIG. 1 and FIG. 2, the printer 1 is provided with a housing 2, a platen conveyance mechanism 6, and a platen 5. The housing 2 is a cuboid shape and includes a front wall 21. A hole 22 is formed in the housing 2. The hole 22 extends from a central portion of the front wall 21 toward the rear. Hereinafter, of the hole 22, a region surrounded by the front wall 21 is referred to as an "opening 221." In other words, the opening 221 is a front end of the hole 22.

An input portion 46 is provided in the front wall 21, diagonally to the right and above the opening 221. Auser inputs various information to the printer 1 by operating the input portion 46. A camera 47 is provided in the front wall 21 above the opening 221. The camera 47 captures an image, from above, of the platen 5.

Figure 3:
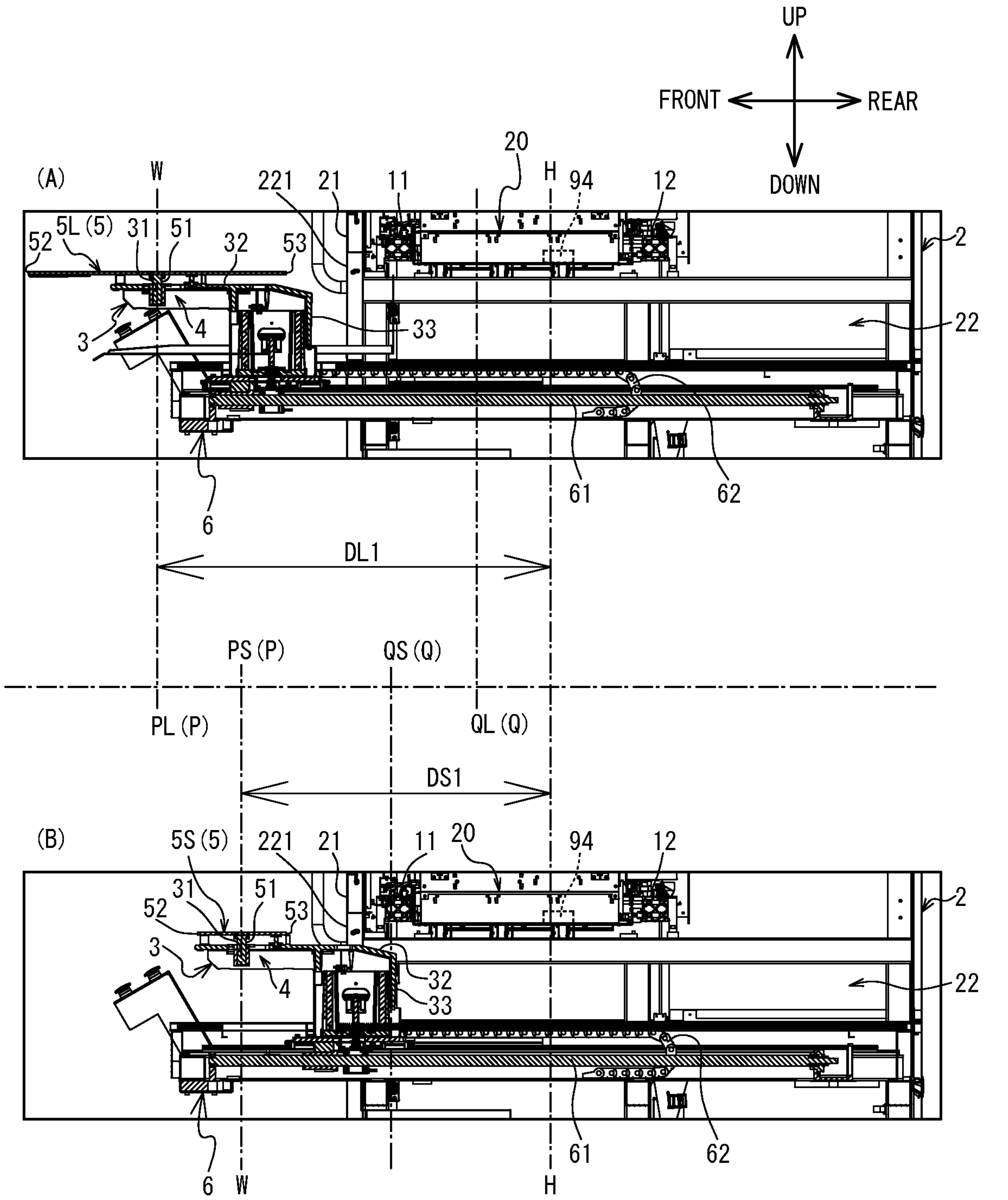
FIG. 3 includes cross-sectional views as seen in the direction of arrows along a line A-A, when a platen is positioned in a set position.
Figure 6:
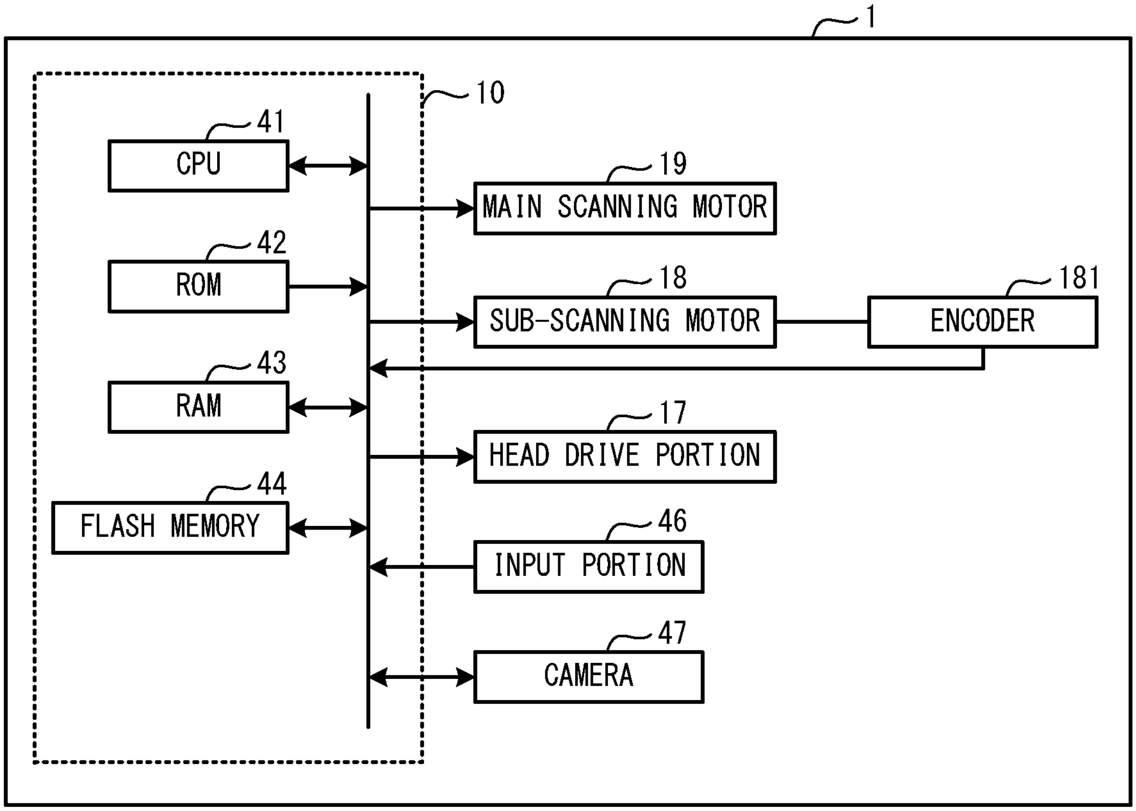
FIG. 6 is a block diagram showing an electrical configuration of the printer.

As shown in FIG. 3, the platen conveyance mechanism 6 is provided with a shaft 61, a conveyance belt 62, a platen support member 3, and a sub-scanning motor 18 shown in FIG. 6, and conveys the platen 5 in the front-rear direction. The shaft 61 and the conveyance belt 62 are provided in a lower portion of the hole 22, and each extends in the front-rear direction. The front end of the shaft 61 extends further to the front side than the opening 221.

The platen support member 3 includes a first section 32 and a second section 33. The first section 32 is plate-shaped and extends in the horizontal direction. The second section 33 extends downward from the rear end portion of the first section 32. The lower end portion of the second section 33 is supported by the shaft 61, and is coupled to the front end of the conveyance belt 62. The sub-scanning motor 18 shown in FIG. 6 is coupled to the conveyance belt 62. When the sub-scanning motor 18 is driven, the conveyance belt 62 moves the platen support member 3 in the front-rear direction along the shaft 61 (a state (A) shown in FIG. 3 and a state (A) shown in FIG. 4, for example).

Figure 4:
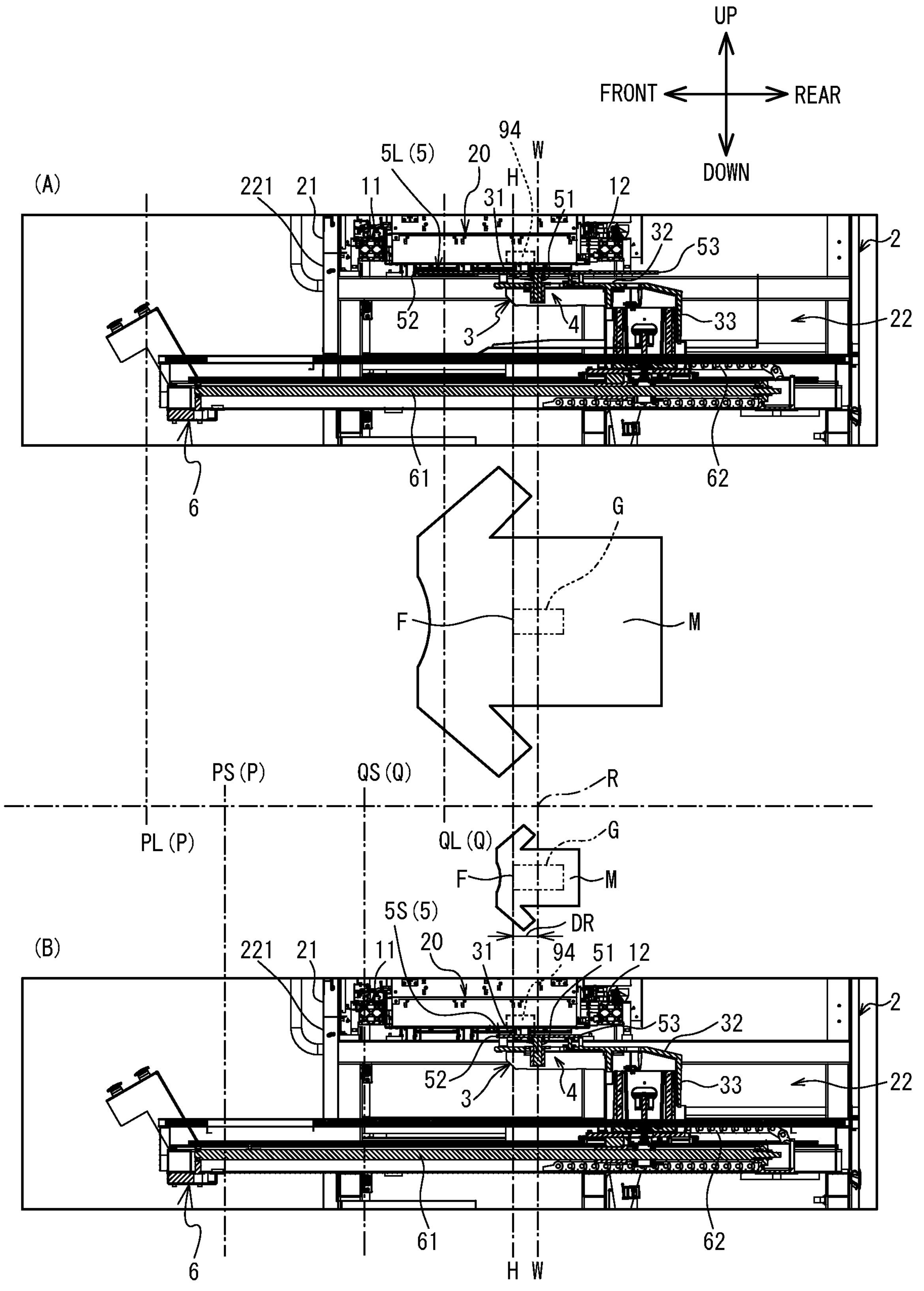
FIG. 4 includes cross-sectional views as seen in the direction of the arrows along the line A-A when the platen is positioned in a return position.

The platen 5 is the shape of a plate that extends in the horizontal direction. The platen 5 is supported by the upper surface of the platen support member 3, and moves in the front-rear direction together with the platen support member 3. In other words, the front-rear direction of the printer 1 is the sub-scanning direction. A print medium M shown in FIG. 4 is placed on the upper surface of the platen 5. The print medium is a cloth, paper, or the like, and is a T-shirt, for example.

The platen 5 can be mounted to and removed from the platen support member 3. In a state in which the platen 5 is mounted to the platen support member 3, the position of the platen 5 is determined at a prescribed position W by a position determining mechanism 4. The prescribed position W is a predetermined position with respect to the platen support member 3. The position determining mechanism 4 includes a convex portion 51 and a concave portion 31. The convex portion 51 extends downward from the bottom surface of the platen 5. The concave portion 31 is recessed downward from the upper surface of the platen support member 3. By the convex portion 51 fitting into the concave portion 31, the position determining mechanism 4 determines the position of the platen 5 at the prescribed position W. In the present embodiment, the prescribed position W is a central position in the front-rear direction of the concave portion 31. Hereinafter, the prescribed position W is used as a reference for the position of the platen 5 in the front-rear direction.

As shown in FIG. 2, the printer 1 is provided with guide rails 11 and 12, a carriage 20, and heads 91 to 96, inside the housing 2. The guide rail 11 is provided in an upper portion of the hole 22 to the rear of the front wall 21, and extends in the left-right direction. The guide rail 12 is provided to the rear of the guide rail 11, and extends in the left-right direction. The carriage 20 is positioned between the guide rail 11 and the guide rail 12 in the front-rear direction, and is supported by the guide rail 11 and the guide rail 12. The carriage 20 moves in the left-right direction along the guide rail 11 and the guide rail 12 as a result of the driving of a main scanning motor 19 shown in FIG. 6.

The heads 91 to 96 are mounted to the carriage 20, and move in the left-right direction together with the carriage 20. In other words, the left-right direction of the printer 1 is a main scanning direction. The heads 91, 92, and 93 are disposed on the right portion of the carriage 20, and are aligned in a row from the rear toward the front in the order of the heads 91, 92, and 93. The heads 94, 95, and 96 are disposed to the left of the row of the heads 91, 92, and 93, and are aligned in a row from the rear toward the front in the order of the heads 94, 95, and 96. In the front-rear direction, the head 94 is disposed between the heads 91 and 92, the head 95 is disposed between the heads 92 and 93, and the head 96 is disposed at a position displaced to the front with respect to the head 93.

The heads 91 to 96 are respectively provided with nozzles (not shown in the drawings). The plurality of nozzles are aligned in the front-rear direction and the left-right direction in the bottom surface of each of the heads 91 to 96. The heads 91 and 94 discharge white ink downward from the nozzles. The heads 92 and 95 discharge a pretreatment agent, special ink, and the like downward from the nozzles. The heads 93 and 96 discharge color ink downward from the nozzles.

According to the above-described configuration, by moving the platen 5 in the front-rear direction (the sub-scanning direction), and moving the heads 91 to 96 in the left-right direction (the main scanning direction), the printer 1 conveys the print medium M (refer to FIG. 4) on the platen 5 in the front-rear direction and the left-right direction with respect to the heads 91 to 96. The printer 1 discharges the ink onto the print medium M on the platen 5 from each of the nozzles of the heads 91 to 96, while moving the print medium M on the platen 5 with respect to the heads 91 to 96.

For example, the printer 1 discharges the white ink onto the print medium M from each of the nozzles of the heads 91 and 94 while conveying the platen 5 from the rear to the front with respect to the heads 91 to 96. In this way, the printer 1 prints a base image on the print medium M. Furthermore, the printer 1 discharges the color ink onto the base image during printing from each of the nozzles of the heads 93 and 96 while printing the base image on the print medium M. In this way, the printer 1 prints a color image superimposed on the base image. As described above, the printer 1 performs the printing on the print medium M on the platen 5. In the following explanation, for convenience, it is assumed that the color image is printed on the base image. When the base image and the color image are collectively referred to, they are referred to as a "print image."

A platen size and a conveyance operation of the platen 5 by the platen conveyance mechanism 6 will be explained with reference to FIG. 3 to FIG. 5. The platen size is the size of the platen 5 in the front-rear direction. There are a plurality of platen sizes in the present embodiment, and in the following explanation, two types will be used, namely, "L" and "S." The platen size "S" is smaller than the platen size "L." Hereinafter, the platen 5 having the platen size "L" will be referred to as a platen 5L (refer to a state (A) in FIG. 3, a state (A) in FIG. 4, and a state (A) in FIG. 5), and the platen 5 having the platen size "S" will be referred to as a platen 5S (refer to a state (B) in FIG. 3, a state (B) in FIG. 4, and a state (B) in FIG. 5).

In the present embodiment, both the platen 5L and the platen 5S are mounted to the same platen support member 3. Thus, the prescribed position W is constant, regardless of the platen size of the platen 5 mounted to the platen support member 3. The printer 1 recognizes the position, in the front-rear direction, of the platen support member 3 using a CPU 41 to be described later (refer to FIG. 6), and performs the printing using the recognized position as a reference. In this way, whichever of the platen 5L or the platen 5S is mounted to the platen support member 3, it is important to determine the position of the platen 5 at the prescribed position W. In the following explanation, a distance to the position in the front-rear direction of the concave portion 31 when the platen 5 is disposed in each of positions to be described later will be indicated, that is, the distance to each of positions of the platen 5 from a printing position H to be described later, using the prescribed position W as a reference.

When a conveyance operation to convey the platen 5 by the platen conveyance mechanism 6 is started, the platen 5 is conveyed to the rear from a set position P shown in FIG. 3 to a return position R shown in FIG. 4. The platen 5 is turned back at the return position R shown in FIG. 4 and is conveyed toward the front to the set position P shown in FIG. 3. In this way, the conveyance operation of the platen 5 by the platen conveyance mechanism 6 ends. As a result, the set position P shown in FIG. 3 is a front end of a movement range of the platen 5, and is also a start point and an end point of a conveyance path of the platen 5. The return position R shown in FIG. 4 is an end point of the movement range of the platen 5, and is also an intermediate position on the conveyance path of the platen 5.

In the following explanation, a position in the front-rear direction at which the heads 91 to 96 shown in FIG. 2 are provided will be referred to as the "printing position H." For example, the printing position H is a position in the front-rear direction of the frontmost row of nozzles of the head that first discharges the ink, of the heads 91 to 96 shown in FIG. 2, when printing the print image. In the present embodiment, the base image is printed first, the base image is printed by the heads 91 and 94 shown in FIG. 2, and the head 94 is disposed in front of the head 91. Thus, the printing position H in the present embodiment indicates the position in the front-rear direction of the frontmost row of nozzles, of the plurality of nozzles, of the head 94.

As shown in FIG. 3, the set position P is a position of the platen 5 when the print medium M shown in FIG. 4 is removed from the platen 5 or is attached to the platen 5. The set position P is a stand-by position of the platen 5 before the start of the printing or after the end of the printing by the printer 1. When the prescribed position W is positioned at the set position P, the platen 5 is positioned at the set position P. In the present embodiment, the set position P is set to a position that differs depending on a distance in the front-rear direction from the printing position H to the set position P corresponding to the platen size.

Figure 5:
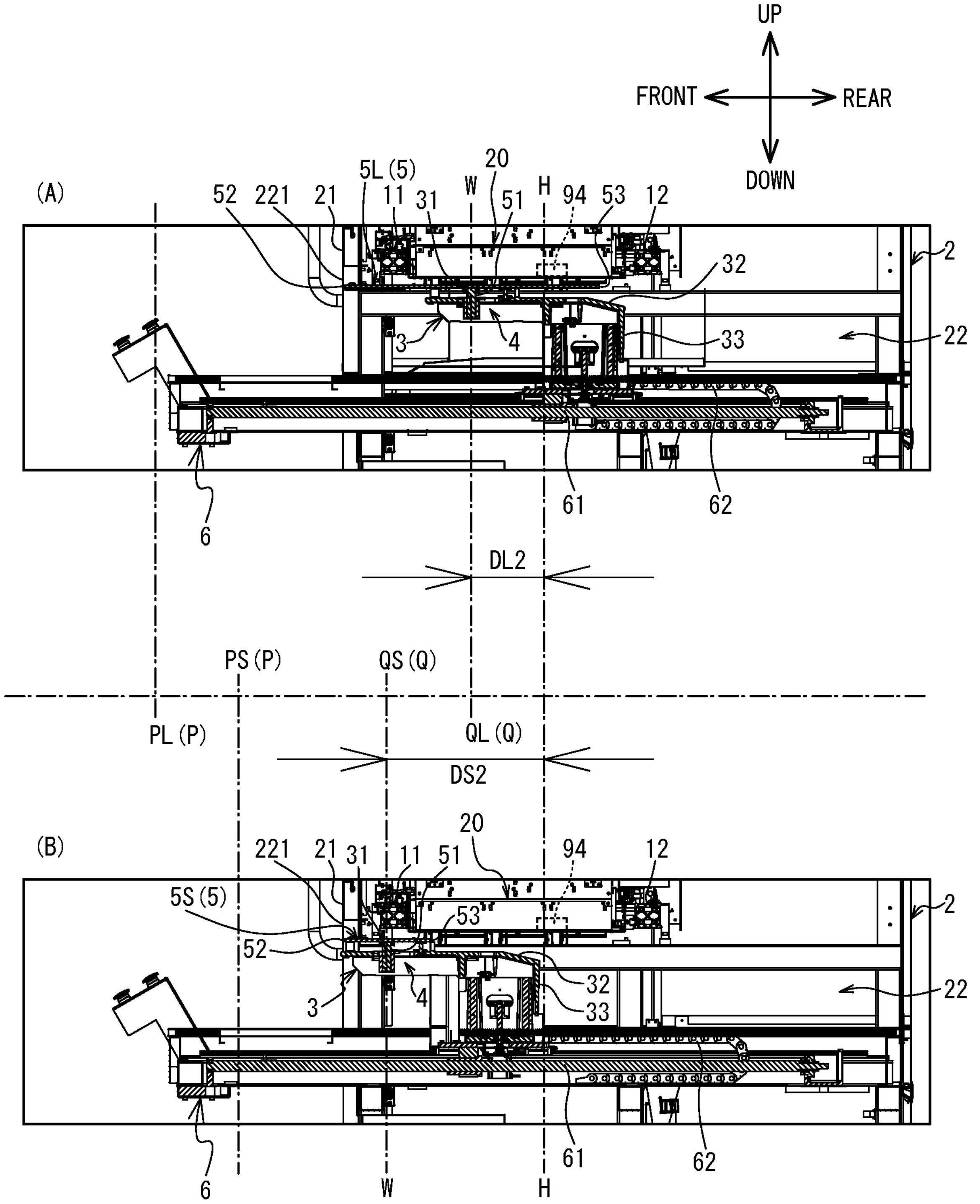
FIG. 5 includes cross-sectional views as seen in the direction of the arrows along the line A-A when the platen is positioned in a switching position.

In the state (A) in FIG. 3, the set position P of the platen 5L is indicated by a set position PL (this also applies to the state (A) in FIG. 4 and the state (A) in FIG. 5). In the state (B) in FIG. 3, the set position P of the platen 5S is indicated by a set position PS (this also applies to the state (B) in FIG. 4 and the state (B) in FIG. 5). A distance DS1 in the front-rear direction from the printing position H to the set position PS is shorter than a distance DL1 in the front-rear direction from the printing position H to the set position PL.

Both in the case in which the platen 5L is positioned at the set position PL and in the case in which the platen 5S is positioned at the set position PS, a rear end 53 of each of the platens 5L and 5S is disposed further to the front than the opening 221. In the present embodiment, in both of the cases, the platens 5L and 5S are disposed in a position that does not overlap with the housing 2 in a plan view, further to the front side than the front wall 21.

Furthermore, when the platen size is "L," an average of the conveyance speed of the platen 5 between the set position PL and the printing position H is set to be a first speed. When the platen size is "S," the average of the conveyance speed of the platen 5 between the set position PS and the printing position H is set to be a second speed. The second speed is faster than the first speed.

As described above, the distance in the front-rear direction from the printing position H to the set position P, and the average of the conveyance speed of the platen 5 between the set position P and the printing position H are set to be different depending on the platen size. In this way, when the platen size is "L," the conveyance operation of the platen 5L is controlled such that a conveyance time period of the platen 5L between the set position PL and the printing position H is a first time period. When the platen size is "S," the conveyance operation of the platen 5S is controlled such that a conveyance time period of the platen 5S between the set position PS and the printing position H is a second time period. The second time period is different from the first time period. In the present embodiment, the distance DS1 is shorter than the distance DL1, and the second speed is faster than the first speed. Thus, the second time period is shorter than the first time period.

In the following explanation, of the print medium M, a region on which the print image is printed by the heads 91 to 96 will be referred to as a "print region G." In other words, the shape of the print region G is a shape corresponding to the shape of the print image. For example, when the shape of the print image is rectangular, the print region G is also a rectangular region. In the state (A) in FIG. 4, as an example, the return position R of the platen 5L is shown when the base image is printed on the print region G on the print medium M. In the state (B) in FIG. 4, as an example, the return position R of the platen 5S is shown when the base image is printed on the print region G on the print medium M.

As shown in FIG. 4, a front end position F is a position of the front end of the print region G. For example, when printing the print image, the front end position F is a position, in the front-rear direction, of a point at which the ink first lands on the print medium M.

The front end position F changes depending on the size in the front-rear direction of the print region G (in other words, the size in the front-rear direction of the print image), and on the position in the front-rear direction of the print region G on the print medium M (in other words, the position in the front-rear direction of the print image). On the other hand, the printing position H does not change depending on the size in the front-rear direction of the print region G and the position in the front-rear direction of the print region G on the print medium M. For example, the printing position H changes depending on whether or not the base image is to be printed, that is, depending on a position in the front-rear direction of the head that first discharges the ink when printing the print image.

The return position R is the position in the front-rear direction of the platen 5 when the front end position F is positioned at the printing position H. In other words, the return position R is the position in the front-rear direction of the prescribed position W when the front end position F is positioned at the printing position H. Thus, a distance DR in the front-rear direction from the printing position H to the return position R differs depending on the front end position F.

As shown by the state (A) in FIG. 4 and the state (B) in FIG. 4, if the position in the front-rear direction of the front end position F with respect to the prescribed position W is the same, regardless of the platen size, the distance DR from the printing position H to the return position R is the same.

As shown in FIG. 5, both in the case in which the platen 5 is conveyed from the set position P to the return position R, and in the case in which the platen 5 is conveyed from the return position R to the set position P, the platen 5 passes through a switching position Q.

The switching position Q is a position in the front-rear direction of the platen 5 when a front end 52 of the platen 5 is positioned at the opening 221. In other words, the switching position Q is the position in the front-rear direction of the prescribed position W when the front end 52 of the platen 5 is positioned at the opening 221.

In the state (A) in FIG. 5, the switching position Q of the platen 5L is indicated by a switching position QL (this also applies to the state (A) in FIG. 3 and the state (A) in FIG. 4). In the state (B) in FIG. 5, the switching position Q of the platen 5S is indicated by a switching position QS (this also applies to the state (B) in FIG. 3 and the state (B) in FIG. 4). A distance in the front-rear direction from the printing position H to the switching position Q differs depending on the platen size. For example, a distance DS2 in the front-rear direction from the printing position H to the switching position QS is longer than a distance DL2 in the front-rear direction from the printing position H to the switching position QL.

In the present embodiment, when the platen 5 reaches the switching position Q from the set position P, the conveyance speed of the platen 5 is accelerated, and when the platen 5 reaches the switching position Q from the printing position H, the conveyance speed of the platen 5 is decelerated. More specifically, the average of the conveyance speed of the platen 5 between the set position P and the switching position Q, and the average of the conveyance speed of the platen 5 between the switching position Q and the printing position H are set in accordance with the platen size, such that the average of the conveyance speed of the platen 5 between the set position P and the printing position H is the speed that accords with the platen size (the first speed or the second speed).

In the present embodiment, when the platen size is "L," the average of the conveyance speed of the platen 5 between the set position PL and the switching position QL is set to a third speed, and the average of the conveyance speed of the platen 5 between the switching position QL and the printing position H is set to a fourth speed. The third speed is slower than the first speed. The fourth speed is faster than the first speed.

When the platen size is "S," the average of the conveyance speed of the platen 5 between the set position PS and the switching position QS is set to a fifth speed, and the average of the conveyance speed of the platen 5 between the switching position QS and the printing position H is set to a sixth speed. The fifth speed is slower than the second speed. The sixth speed is faster than the second speed.

The electrical configuration of the printer 1 will be explained with reference to FIG. 6. The printer 1 is provided with a control board 10. The CPU 41, a ROM 42, a RAM 43, and a flash memory 44 are provided on the control board 10. The CPU 41 controls the printer 1 and is electrically connected to the ROM 42, the RAM 43, and the flash memory 44. The ROM 42 stores a control program used for the CPU 41 to control operations of the printer 1, and various pieces of information and the like needed by the CPU 41 when executing various programs. The ROM 42 stores, on the basis of a rotation angle of the sub-scanning motor 18, the position of the platen 5 in the front-rear direction (the set position PL, PS, the switching position QL, QS, and the like), in association with the platen size. The ROM 42 stores the conveyance speed of the platen 5 in each of zones (the third speed, the fourth speed, the fifth speed, the sixth speed, and the like), in association with the platen size. The RAM 43 temporarily stores various data used by the control program. The flash memory 44 is a non-volatile memory, and stores the platen size, print data for performing the printing, and the like.

The CPU 41 is electrically connected to the main scanning motor 19, the sub-scanning motor 18, a head drive portion 17, the input portion 46, and the camera 47. The main scanning motor 19, the sub-scanning motor 18, and the head drive portion 17 are driven by control by the CPU 41. An encoder 181 is provided in the sub-scanning motor 18. The encoder 181 detects the rotation angle of the sub-scanning motor 18, and outputs a detection result to the CPU 41. The head drive portion 17 is a piezoelectric element or the like, and, as a result of the driving of the head drive portion 17, the heads 91 to 96 are caused to discharge the ink from the nozzles.

The input portion 46 outputs information to the CPU 41 in accordance with an operation. By operating the input portion 46, the user can input, to the printer 1, the platen size, a print command for starting the printing by the printer 1, and the like. The camera 47 captures an image in accordance with a command from the CPU 41 or a command from the user, and outputs an image capture result to the CPU 41.

Figure 7:
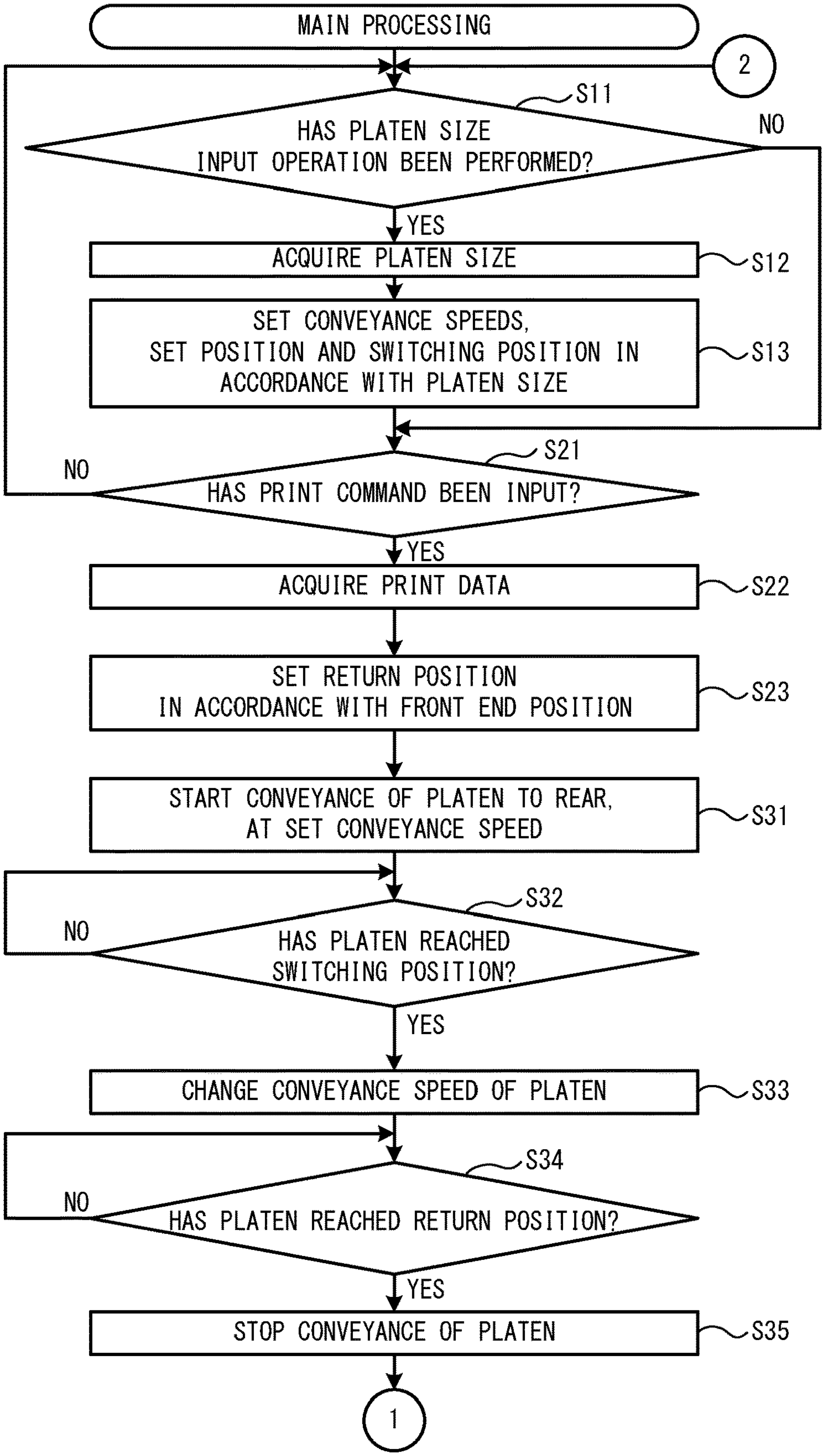
FIG. 7 is a flowchart of main processing.

Main processing will be explained with reference to FIG. 7 and FIG. 8. When a power supply of the printer 1 is turned on, the CPU 41 executes the main processing by reading out the control program from the ROM 42 and operating the control program. In the main processing, acquisition of the platen size, a conveyance operation of the platen 5, print control and the like are performed.

When the power supply of the printer 1 is turned on, in the previous main processing, for example, the platen 5 is positioned at the set position P set in the flash memory 44 at step S13 to be described later. For example, there is a case in which the previous printing has been performed with the platen 5L attached to the platen support member 3, and the power supply of the printer 1 is turned off In this case, since the set position PL is set in the flash memory 44, when the power supply of the printer 1 is turned on, the platen 5L is positioned at the set position PL.

When the platen 5L is replaced with the platen 5S, for example, the user removes the platen 5L from the platen support member 3 in the state in which the platen 5L is positioned at the set position PL, and attaches the platen 5S to the platen support member 3. Note that a timing at which the user replaces the platen 5 on the platen support member 3 may be before the power supply to the printer 1 is turned on, or may be after input of the platen size.

When the main processing is started, the CPU 41 determines whether the input operation of the platen size has been performed (step S11). When the input operation of the platen size has not been performed on the input portion 46 (no at step S11), the CPU 41 shifts the processing to step S21.

The user operates the input portion 46 and input the platen size to the printer 1. When the input operation of the platen size has been performed on the input portion 46 (yes at step S11), the CPU 41 acquires the platen size in accordance with the input operation and stores the platen size in the flash memory 44 (step S12). In accordance with the platen size acquired at step S12, the CPU 41 respectively sets, in the flash memory 44, the conveyance speed of the platen 5 between the set position P and the switching position Q shown in FIG. 3 to FIG. 5, the conveyance speed of the platen 5 between the switching position Q and the printing position H, the set position P, and the switching position Q (step S13). In this way, the CPU 41 decides the conveyance operation of the platen 5 in accordance with the platen size acquired at step S12.

At step S13, the CPU 41 refers to the flash memory 44 and determines whether the platen size acquired at step S12 is "L" or "S." As described above, the position of the platen 5 in the front-rear direction and the conveyance speed of the platen 5 in each of the zones are respectively stored in the ROM 42 in association with the platen size. The CPU 41 refers to the ROM 42, identifies the set position P and the switching position Q corresponding to the platen size, and identifies the conveyance speed of the platen 5 in each of the zones corresponding to the platen size.

When the platen size "L" is acquired at step S12, the conveyance operation of the platen 5 is decided such that the conveyance time period of the platen 5 by the platen conveyance mechanism 6 between the set position P and the printing position H is the first time period. In the present embodiment, the CPU 41 sets the identified third speed as the conveyance speed of the platen 5 between the set position P and the switching position Q. The CPU 41 sets the identified fourth speed as the conveyance speed of the platen 5 between the switching position Q and the printing position H. The CPU 41 sets the identified set position PL as the set position P. The CPU 41 sets the identified switching position QL as the switching position Q.

When the platen size "S" is acquired at step S12, the conveyance operation of the platen 5 is decided such that the conveyance time period of the platen 5 by the platen conveyance mechanism 6 between the set position P and the printing position H is the second time period. In the present embodiment, the CPU 41 sets the identified fifth speed as the conveyance speed of the platen 5 between the set position P and the switching position Q. The CPU 41 sets the identified sixth speed as the conveyance speed of the platen 5 between the switching position Q and the printing position H. The CPU 41 sets the identified set position PS as the set position P. The CPU 41 sets the identified switching position QS as the switching position Q.

The CPU 41 determines whether the print command has been input (step S21). When the print command has not been input (no at step S21), the CPU 41 returns the processing to step S11. The user attaches the print medium M shown in FIG. 4 to the platen 5 in the state in which the platen 5 shown in FIG. 3 is positioned at the set position P. After that, the user operates the input portion 46, and inputs the print command to the printer 1. When the print command has been input (yes at step S21), the CPU 41 acquires the print data from the flash memory 44 (step S22).

The CPU 41 sets, in the flash memory 44, the return position R shown in FIG. 4, in accordance with the front end position F shown in FIG. 4 (step S23). At step S23, the CPU 41 loads the print image to the RAM 43, on the basis of the print data acquired at step S22. The CPU 41 identifies the front end position F shown in FIG. 4 on the basis of the print image. The CPU 41 sets, as the return position R, the position of the platen 5 in the front-rear direction, that is, the position in the front-rear direction of the prescribed position W, when the front end position F shown in FIG. 4 is disposed at the printing position H.

The CPU 41 executes the decided conveyance operation of the platen 5. For example, the CPU 41 controls the sub-scanning motor 18 and starts the conveyance of the platen 5 to the rear at the conveyance speed of the platen 5, set at step S13, between the set position P and the switching position Q (step S31). At step S31, the platen 5L is conveyed at the third speed from the set position P of the previous printing toward the switching position QL, and the platen 5S is conveyed at the fifth speed from the set position P of the previous printing toward the switching position QS.

On the basis of a detection result from the encoder 181, the CPU 41 determines whether the platen 5 has reached the switching position Q set at step S13 (step S32). When the platen 5 is positioned further to the front than the switching position Q set at step S13 (no at step S32), the CPU 41 returns the processing to step S32, and repeats the processing at step S32 until the platen 5 reaches the switching position Q set at step S13.

When the platen 5 has reached the switching position Q set at step S13 (yes at step S32), the CPU 41 controls the sub-scanning motor 18 and changes the conveyance speed of the platen 5 to the conveyance speed of the platen 5, set at step S13, between the switching position Q and the printing position H (step S33). By the processing at step S33, the platen 5L is conveyed from the switching position QL at the fourth speed toward the return position R, and the platen 5S is conveyed from the switching position QS at the sixth speed toward the return position R.

On the basis of the detection result from the encoder 181, the CPU 41 determines whether the platen 5 has reached the return position R set at step S23 (step S34). When the platen 5 is positioned further to the front than the return position R set at step S23 (no at step S34), the CPU 41 returns the processing to step S34, and repeats the processing at step S34 until the platen 5 reaches the return position R set at step S23.

When the platen 5 has reached the return position R set at step S23 (yes at step S34), the CPU 41 stops the driving of the sub-scanning motor 18 and stops the conveyance of the platen 5 (step S35). By the processing at step S35, the platen 5 temporarily stops at the return position R set at step S23.

Figure 8:
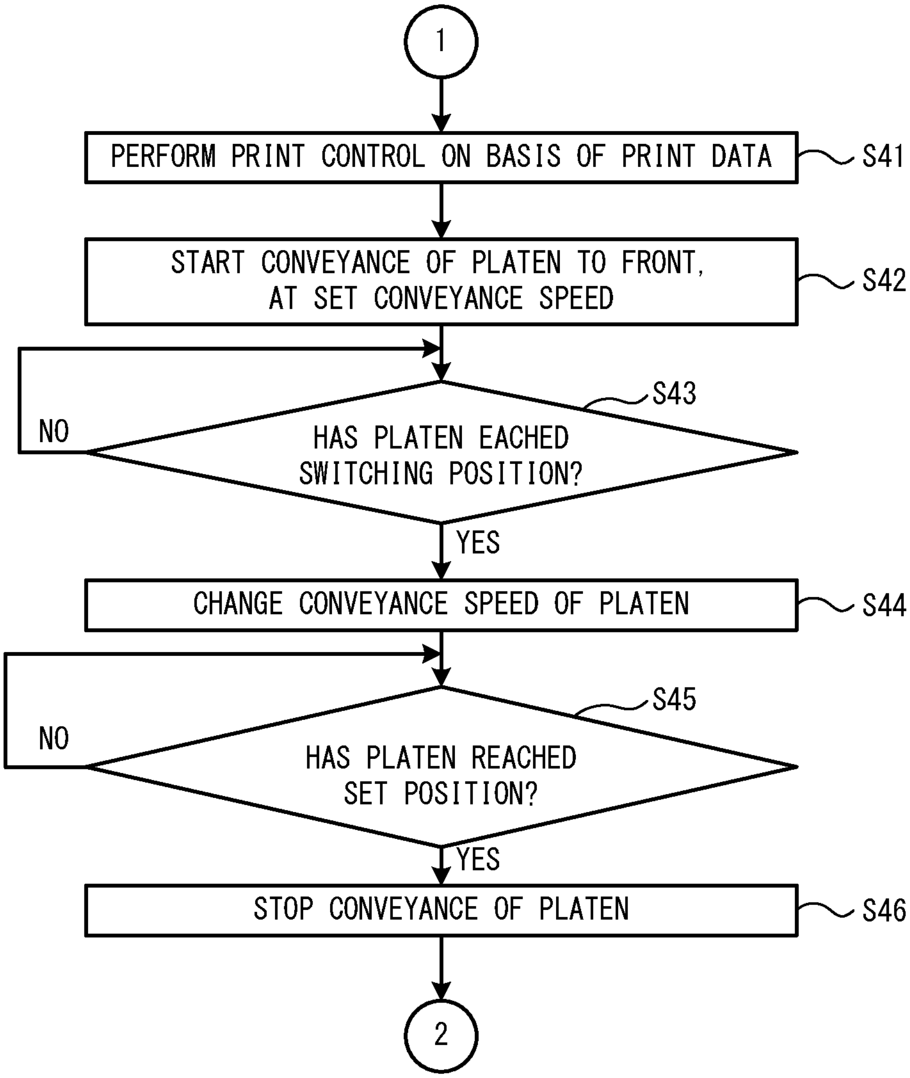
FIG. 8 is a flowchart of the main processing and is a continuation of FIG. 7.

As shown in FIG. 8, the CPU 41 performs print control on the basis of the print data (step S41). In the print control, the CPU 41 controls the main scanning motor 19 and the head drive portion 17 in synchronization with the conveyance operation of the platen 5. For example, the carriage 20 reciprocates in the left-right direction while some or all of the heads 91 to 96 discharge the ink from the nozzles, and after that, the platen 5 is conveyed to the front by a predetermined distance. This operation is repeated on the basis of the print data from the state in which the platen 5 is positioned at the return position R set at step S23.

More specifically, in a reciprocating operation of the heads 91 to 96 in the left-right direction, first, the white ink is discharged from the heads 91 and 94 and the base image is printed. After that, when the platen 5 is conveyed to the front and the base image is disposed below the heads 93 and 96, in the reciprocating operation of the heads 91 to 96 in the left-right direction, the color ink is discharged from the heads 93 and 96. In this way, while the base image is printed using the white ink, the color image is printed by the color ink in a superimposed manner on the base image. When the printing of the entire print image on the print medium M on the platen 5 is complete, the driving of the sub-scanning motor 18, the main scanning motor 19, and the head drive portion 17 is stopped, and the print control ends.

The CPU 41 controls the sub-scanning motor 18 and conveys the platen 5 to the front at the conveyance speed of the platen 5, set at step S13, between the switching position Q and the printing position H (step S42). By the processing at step S42, the platen 5 is conveyed toward the switching position Q set at step S13, at the fourth speed or the sixth speed, from the position at which the print control ends.

On the basis of the detection result from the encoder 181, the CPU 41 determines whether the platen 5 has reached the switching position Q set at step S13 (step S43). When the platen 5 is positioned further to the rear than the switching position Q set at step S13 (no at step S43), the CPU 41 returns the processing to step S43, and repeats the processing at step S43 until the platen 5 reaches the switching position Q set at step S13.

When the platen 5 has reached the switching position Q set at step S13 (yes at step S43), the CPU 41 controls the sub-scanning motor 18 and changes the conveyance speed of the platen 5 to the conveyance speed of the platen 5, set at step S13, between the set position P and the switching position Q (step S44). By the processing at step S44, the platen 5L is conveyed from the switching position QL at the third speed toward the set position PL, and the platen 5S is conveyed from the switching position QS at the fifth speed toward the set position PS.

On the basis of the detection result of the encoder 181, the CPU 41 determines whether the platen 5 has reached the set position P set at step S13 (step S45). When the platen 5 is positioned further to the rear than the set position P set at step S13 (no at step S45), the CPU 41 returns the processing to step S45, and repeats the processing at step S45 until the platen 5 reaches the set position P set at step S13.

When the platen 5 has reached the set position P set at step S13 (yes at step S45), the CPU 41 stops the driving of the sub-scanning motor 18 and stops the conveyance of the platen 5 (step S46). By the processing at step S46, the platen 5L is stopped at the set position PL, and the platen 5S is stopped at the set position PS. The CPU 41 returns the processing to step S11 shown in FIG. 7.

The user stands in front of the front wall 21 in the state in which the platen 5 is stopped at the set position P set at step S13, removes the printed print medium M from the platen 5, and attaches the not yet printed print medium M to the platen 5. In this case, the rear end 53 of the platen 5 is disposed further to the front than the opening 221, and interference between the front wall 21 and the print medium M is thus suppressed. As a result, in the present embodiment, the user easily removes the print medium M from the platen 5 and easily attaches the print medium M to the platen 5.

As described above, in the present embodiment, the printer 1 is provided with the heads 91 to 96, the platen 5, the platen conveyance mechanism 6, and the CPU 41. The heads 91 to 96 perform the printing on the print medium M. The platen 5 supports the print medium M. The platen conveyance mechanism 6 conveys the platen 5 in the front-rear direction with respect to the heads 91 to 96. The CPU 41 acquires the platen size. The platen size is the size of the platen 5 in the front-rear direction. The CPU 41 controls the conveyance operation of the platen 5 by the platen conveyance mechanism 6. When the platen size "L" is acquired, the CPU 41 controls the conveyance operation of the platen 5 such that the conveyance time period of the platen 5 by the platen conveyance mechanism 6 between the set position P of the print medium M and the printing position H is the first time period. The printing position H is the position in the front-rear direction at which the heads 91 to 96 are provided. When the platen size "S" is acquired, the CPU 41 controls the conveyance operation of the platen 5 such that the conveyance time period of the platen 5 by the platen conveyance mechanism 6 between the set position P and the printing position H is the second time period. The platen size "S" is smaller than the platen size "L." The second time period is different to the first time period. Thus, the printer 1 can cause the conveyance time period of the platen 5 between the set position P and the printing position H to be different between the case in which the platen size “L” is acquired and the case in which the platen size “S” is acquired.

In the present embodiment, when the platen size “S” is acquired, the CPU 41 controls the conveyance operation of the platen 5 such that the conveyance time period of the platen 5 by the platen conveyance mechanism 6 between the set position P and the printing position H is the second time period. The second time period is shorter than the first time period. Thus, when the platen size “S” is acquired, the printer 1 can shorten the conveyance time period of the platen 5 between the set position P and the printing position H compared to when the platen size “L” is acquired. As a result, the printer 1 can improve printing productivity.

In the present embodiment, when the platen size “L” is acquired, the CPU 41 sets the set position P to a position at which the distance DL1 in the front-rear direction from the printing position H is a first distance. When the platen size “S” is acquired, the CPU 41 sets the set position P to a position at which the distance DS1 in the front-rear direction from the printing position H is a second distance. The second distance (the distance DS1) is different from the first distance (the distance DL1). Thus, the printer 1 can cause the conveyance time period of the platen 5 between the set position P and the printing position H to be different between the case in which the platen size “L” is acquired and the case in which the platen size “S” is acquired.

For example, it is assumed that the platen 5S is conveyed to the set position PL. In this case, the distance in the front-rear direction from the printing position H to the set position P is longer compared to when the platen 5S is conveyed to the set position PS. As a result, the conveyance time period of the platen 5S between the printing position H and the set position P becomes longer. Thus, there is a possibility that the printing productivity of the printer 1 may deteriorate. In the present embodiment, when the platen size “S” is acquired, the CPU 41 sets the set position P to the position at which the distance DS1 in the front-rear direction from the printing position H is the second distance. The second distance (the distance DS1) is shorter than the first distance (the distance DL1). Thus, when the platen size “S” is acquired, the printer 1 can shorten the conveyance time period of the platen 5 between the set position P and the printing position H compared to when the platen size “L” is acquired. As a result, the printer 1 can improve the printing productivity.

In the present embodiment, when the platen size “L” is acquired, the CPU 41 controls the conveyance operation of the platen 5 such that the average of the conveyance speed of the platen 5 by the platen conveyance mechanism 6 between the set position P and the printing position H is the first speed. When the platen size “S” is acquired, the CPU 41 controls the conveyance operation of the platen 5 such that the average of the conveyance speed of the platen 5 by the platen conveyance mechanism 6 between the set position P and the printing position H is the second speed. The second speed is different from the first speed. Thus, the printer 1 can cause the conveyance time period of the platen 5 between the set position P and the printing position H to be different between the case in which the platen size “L” is acquired and the case in which the platen size “S” is acquired.

In the present embodiment, the printer 1 is provided with the front wall 21. The opening 221 is provided in the front wall 21. The platen 5 passes through the opening 221 when the platen 5 is conveyed by the platen conveyance mechanism 6 between the set position P and the printing position H. The platen conveyance mechanism 6 conveys the platen 5 between the set position P and the printing position H via the switching position Q. The switching position Q is the position of the platen 5 when the front end 52 of the platen 5 is positioned at the opening 221. When the platen size “L” is acquired, the CPU 41 controls the conveyance operation of the platen 5 such that the average of the conveyance speed of the platen 5 by the platen conveyance mechanism 6 between the set position P and the switching position QL corresponding to the platen size “L” is the third speed, and also controls the conveyance operation of the platen 5 such that the average of the conveyance speed of the platen 5 by the platen conveyance mechanism 6 between the switching position QL corresponding to the platen size “L” and the printing position H is the fourth speed. The third speed is slower than the first speed. The fourth speed is faster than the first speed. On the other hand, when the platen size “S” is acquired, the CPU 41 controls the conveyance operation of the platen 5 such that the average of the conveyance speed of the platen 5 by the platen conveyance mechanism 6 between the set position P and the switching position QS corresponding to the platen size “S” is the fifth speed, and also controls the conveyance operation of the platen 5 such that the average of the conveyance speed of the platen 5 by the platen conveyance mechanism 6 between the switching position QS corresponding to the platen size “S” and the printing position H is the sixth speed. The fifth speed is slower than the second speed. The sixth speed is faster than the second speed. When the platen size “S” is acquired, the distance in the front-rear direction between the switching position Q and the printing position H is longer than when the platen size “L” is acquired. Thus, when the platen size “S” is acquired, the influence of the conveyance speed of the platen 5 between the switching position Q and the printing position H on the conveyance time period of the platen 5 between the switching position Q and the printing position H is greater than when the platen size “L” is acquired. In the printer 1, the fourth speed is faster than the third speed, and the sixth speed is faster than the fifth speed. Thus, the printer 1 can cause the conveyance time period of the platen 5 between the switching position Q and the printing position H when the platen size “S” is acquired to be shorter than when the platen size “L” is acquired. As a result, the printer 1 can improve the printing productivity.

In the present embodiment, the CPU 41 sets the set position P to the position at which the rear end 53 of the platen 5 is disposed further to the front than the opening 221. For example, in the state in which the platen 5 is positioned at the set position P, the print medium M is attached to the platen 5, or the print medium M is removed from the platen 5. In this case, with either of the platen sizes, the rear end 53 of the platen 5 is disposed further to the front than the opening 221, and thus, the interference between the print medium M and the front wall 21 is suppressed. Thus, at the same time that the printer 1 causes the conveyance time period of the platen 5 between the set position P and the printing position H to be different between the case in which the platen size “L” is acquired and the case in which the platen size “S” is acquired, regardless of which size the platen size is changed to, the print medium M is easily attached to the platen 5 and the print medium M is easily removed from the platen 5.

In the present embodiment, after conveying the platen 5 from the set position P to the predetermined return position R, the CPU 41 causes the platen conveyance mechanism 6 to convey the platen 5 from the return position R to the set position P. The CPU 41 sets the position of the platen 5 when the front end position F is disposed at the printing position H as the return position R. The front end position F is the position of the front end of the print region G. The print region G is the region, of the print medium M, on which the image is printed by the heads 91 to 96. The printer 1 can omit the conveyance of the platen 5 to the position at which the front end position F is disposed at the printing position H after the platen 5 is returned at the return position R. Thus, the printer 1 can shorten the conveyance time period of the platen 5. As a result, the printer 1 can improve the printing productivity.

In the present embodiment, the CPU 41 starts the conveyance operation of the platen 5 by causing the platen conveyance mechanism 6 to convey the platen 5 from the set position P. The printer 1 can cause the conveyance time period of the platen 5 between the set position P and the printing position H to be different between the case in which the platen size “L” is acquired and the case in which the platen size “S” is acquired.

In the present embodiment, the CPU 41 ends the conveyance operation of the platen 5 by causing the platen conveyance mechanism 6 to stop the platen 5 at the set position P. The printer 1 can cause the conveyance time period of the platen 5 between the set position P and the printing position H to be different between the case in which the platen size “L” is acquired and the case in which the platen size “S” is acquired.

Various modifications can be made to the present disclosure from the above-described embodiment. The various modified examples to be described below can be respectively combined insofar as no contradictions arise. For example, the present disclosure can be applied to a different type of printer from the inkjet type as in the above-described embodiment.

At the set position P, the rear end 53 of the platen 5 may be disposed further to the rear than the opening 221, but in the above-described embodiment, at the set position P, the platen 5 is disposed in the position at which the platen 5 does not overlap with the housing 2 in plan view, further to the front than the front wall 21 in which the opening 221 is provided. In contrast to this, at the set position P, if the rear end 53 of the platen 5 is disposed further to the front than the opening 221, a part of the housing 2 may be disposed below the platen 5, for example.

In the above-described embodiment, the number of the heads 91 to 96, arrangement positions of the heads 91 and 96, and the type of liquid discharged from the heads 91 to 96 are not limited to those of the above-described embodiment. The platen size is not limited to the two types of “L” and “S” and there may be three or more types. The position determining mechanism 4 is not limited to that of the above-described embodiment, and may determine the position of the platen 5 at the prescribed position W using an urging member or the like. The printer 1 need not necessarily be provided with the housing 2, and may be configured by a frame structure. The platen conveyance mechanism 6 is not limited to that of the above-described embodiment, and may convey the platen 5 in the front-rear direction using a ball screw or the like.

In the above-described embodiment, the conveyance operation of the platen 5 may be controlled such that the second time period is longer than the first time period. For example, the distance DS1 in the front-rear direction from the printing position H to the set position PS may be longer than the distance DL1 in the front-rear direction from the printing position H to the set position PL. The second speed may be slower than the first speed.

In the above-described embodiment, the distance DS1 in the front-rear direction from the printing position H to the set position PS may be the same as the distance DL1 in the front-rear direction from the printing position H to the set position PL. In other words, as long as the second time period is different from the first time period, the distance in the front-rear direction from the printing position H to the set position P may be constant regardless of the platen size. In the above-described embodiment, the second speed may be the same as the first speed. In other words, as long as the second time period is different from the first time period, the average of the conveyance speed of the platen 5 between the set position P and the printing position H may be constant regardless of the platen size.

The third speed and the fourth speed may be the same as the first speed, and the fifth speed and the sixth speed may be the same as the second speed. In other words, the platen 5 may be conveyed between the set position P and the printing position H at a constant speed. The third speed may be faster than the first speed. The fourth speed may be slower than the first speed. The fifth speed may be faster than the second speed. The sixth speed may be slower than the second speed.

In the above-described embodiment, the description is given that the platen 5 is positioned at the set position P when the prescribed position W is positioned at the set position P. In contrast to this, the platen 5 may be positioned at the set position P when the front end 52 of the platen 5 is positioned at the set position P. The platen 5 may be positioned at the set position P when the rear end 53 of the platen 5 is positioned at the set position P. The platen 5 may be positioned at the set position P when the center of the platen 5 in the front-rear direction is positioned at the set position P. The above also applies to when the platen 5 is positioned at the return position R.

For example, the position of the platen 5L may be the set position PL when a distance between the rear end 53 of the platen 5L and the opening 221 is a predetermined distance, and the position of the platen 5S may be the set position PS when a distance between the rear end 53 of the platen 5S and the opening 221 is the predetermined distance. In other words, the distance in the front-rear direction between the rear end 53 of the platen 5L and the opening 221 when the platen 5L is positioned at the set position PL, and the distance in the front-rear direction between the rear end 53 of the platen 5S and the opening 221 when the platen 5S is positioned at the set position PS may be the same predetermined distance.

In the above-described embodiment, the description is given in which, of the plurality of nozzles of the head 94, the position of the frontmost nozzle in the front-rear direction is the printing position H. In contrast to this, when the color ink is discharged before the white ink, for example, the position of the frontmost nozzle in the front-rear direction of the plurality of nozzles of the head 96 is the printing position H. In this case, the region of the print medium M on which the color image is printed is the print region G. Furthermore, the printing position H may be the center in the front-rear direction of any one of the heads 91 to 96, may be a central position in the front-rear direction of all of the heads 91 to 96, or may be a position of the front end or the rear end of the heads 91 to 96.

In the above-described embodiment, the CPU 41 acquires the platen size in accordance with the operation of the input portion 46. In contrast to this, the CPU 41 may acquire the platen size by receiving the platen size from an external computer.

In the above-described embodiment, the CPU 41 may acquire an image capture result from the camera 47 and may identify the platen size on the basis of the acquired image capture result. For example, the camera 47 captures an image of the whole of the platen 5. The CPU 41 performs known filter processing that performs edge extraction on the basis of the image capture result from the camera 47, and identifies a contour of the platen 5. In this way, the CPU 41 recognizes an overall image of the platen 5 captured by the camera 47, and identifies the platen size. The printer 1 may adopt another method as the method of identifying the platen size using the camera 47. For example, identification information is attached to the platen 5. The identification information is a barcode, a QR code (registered trademark), or the like, and is information that can distinguish one of the platens 5 from the other platens 5. The identification information may simply be information that can distinguish one of the platen sizes from the other platen sizes. The camera 47 may capture an image of the identification information, and the CPU 41 may identify the platen size by recognizing the identification information captured by the camera 47.

In the above-described modified example, the CPU 41 acquires the platen size from the image capture result of the camera 47. Thus, in the printer 1, there is no need to increase or reduce sensors for detecting the platen size in accordance with an increase or decrease in the types of the platen size, nor a need to change an input screen for inputting the platen size. As a result, the printer 1 can easily respond to an increase or decrease in a number of the platen sizes.

In the above-described embodiment, the user operates the input portion 46 and inputs the platen size to the printer 1. In contrast to this, the user may input, to the printer 1, information with which the platen size can be identified. The information with which the platen size can be identified is a model number, a serial number or the like of the platen 5. The user may input, to the printer 1, the actual length of the platen 5 in the front-rear direction.

In the above-described embodiment, the CPU 41 identifies the position of the platen 5 in the front-rear direction on the basis of the detection result from the encoder 181. Thus, the printer 1 can identify each of the positions of the platen 5 in the front-rear direction using the single encoder 181, irrespective of the number of types of platen size. In contrast to this, the printer 1 may be provided with sensors for detecting the platen 5 at each of positions, at each of the positions for each of the platen sizes. In this case, the CPU 41 may identify that the platen 5 is positioned at each of the positions on the basis of the detection results from the sensors. Each of the sensors is a camera, a switch sensor, an optical sensor, or the like.

For example, there is a case in which the power supply of the printer 1 is turned off in a state in which the platen 5 is positioned at a position different from the set position P set at step S13. In this case, when the power supply of the printer 1 is turned on, the platen 5 is positioned at the above-described different position. For example, when the power supply of the printer 1 is turned on, the CPU 41 may determine whether the platen 5 is positioned at the set position P set at step S13, on the basis of the detection result from the encoder 181. When the platen 5 is positioned at the position that is different from the set position P set at step S13, as an initial operation before the printing, the CPU 41 may control the sub-scanning motor 18 and convey the platen 5 to the set position P set at step S13. Even when the platen size is changed, similarly, as the initial operation before the printing, the CPU 41 may control the sub-scanning motor 18 and convey the platen 5 to the set position P set at step S13.

Figure 9:
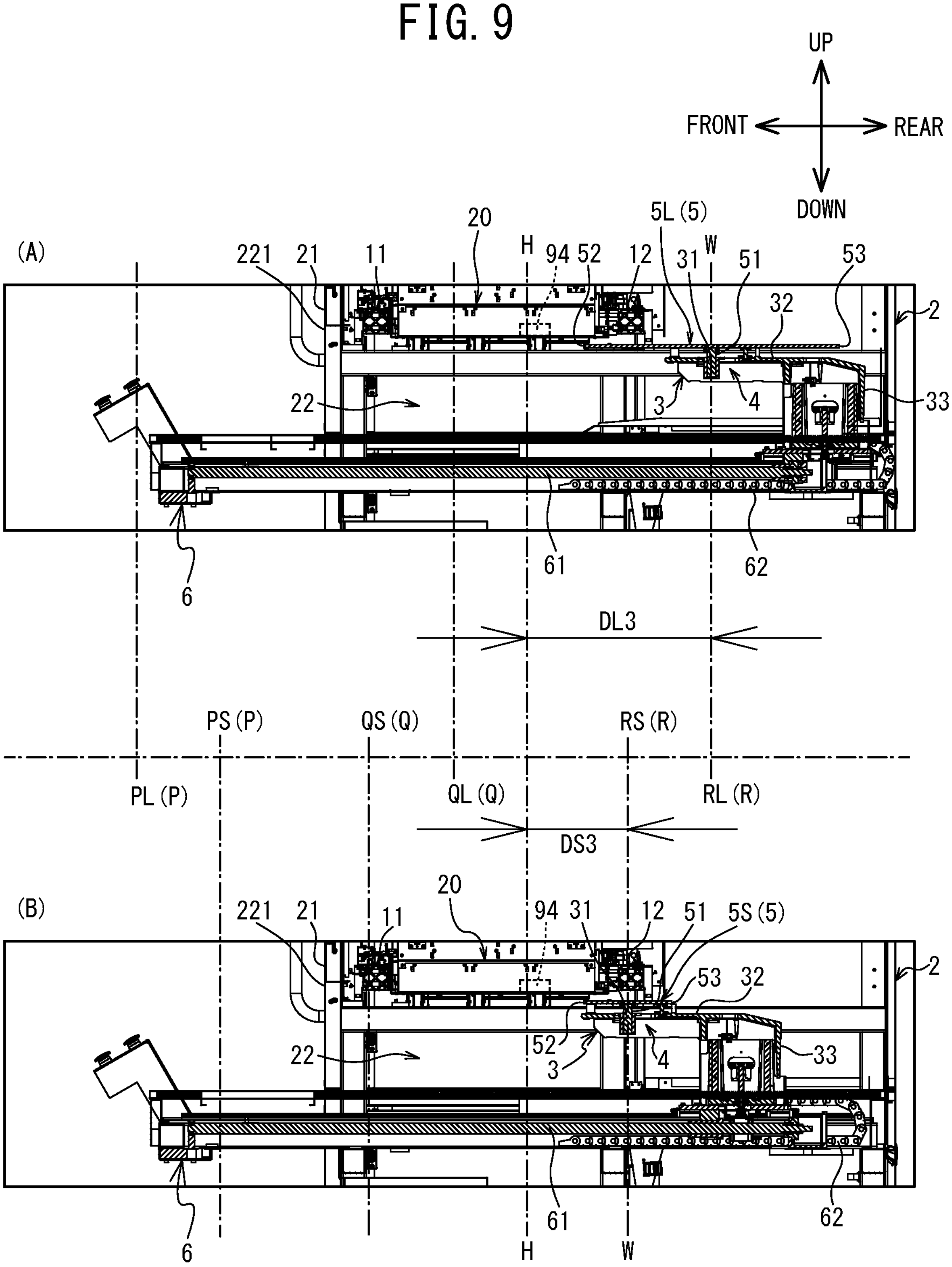
FIG. 9 includes cross-sectional views as seen in the direction of the arrows along the line A-A when the platen is positioned in the return position.

In the above-described embodiment, the distance DR in the front-rear direction from the printing position H to the return position R is different depending on the front end position F in relation to the prescribed position W. In contrast to this, the distance DR in the front-rear direction from the printing position H to the return position R may be different depending on the platen size. In a state (A) shown in FIG. 9, the return position R of the platen 5L is shown as a return position RL. In a state (B) shown in FIG. 9, the return position R of the platen 5S is shown as a return position RS. The return position R is positioned on the opposite side of the printing position H from the set position P. A distance DS3 in the front-rear direction from the printing position H to the return position RS is shorter than a distance DL3 in the front-rear direction from the printing position H to the return position RL. In this case, step S23 shown in FIG. 7 may be omitted, and at step S13, the return position R may be set depending on the platen size acquired at step S12.

In the above-described modified example, after conveying the platen 5 from the set position P to the return position R via the printing position H, the CPU 41 causes the platen conveyance mechanism 6 to convey the platen 5 from the return position R to the set position P via the printing position H. The return position R is on the opposite side to the set position P with respect to the printing position H, in the front-rear direction. When the platen size "L" is acquired, the CPU 41 sets, as the return position R, a position at which the distance DL3 from the printing position H in the front-rear direction is a third distance. When the platen size "S" is acquired, the CPU 41 sets, as the return position R, a position at which the distance DS3 from the printing position H in the front-rear direction is a fourth distance. The fourth distance (the distance DS3) is shorter than the third distance (the distance DL3). Thus, the printer 1 can shorten the conveyance time period of the platen 5 between the printing position H and the return position R when the platen size "S" is acquired compared to when the platen size "L" is acquired. As a result, the printer 1 can improve the printing productivity.

In printing control, overlaid base printing may be controlled. In the superimposed base printing, a further base image is printed in a superimposed manner on the base image, and the color image is printed in a superimposed manner on top of the superimposed base printing. More specifically, the white ink is discharged from the heads 91 and 94, and the base image of a first cycle is printed. When the printing of all of the base image of the first cycle is complete, the sub-scanning motor 18 is controlled, and the platen 5 is returned to the return position R. After that, the white ink is discharged from the heads 91 and 94, and the color ink is discharged from the heads 93 and 96. In this way, while printing the base image of a second cycle in the superimposed manner, using the white ink, on the base image of the first cycle, the color image is printed in the superimposed manner, using the color ink, on the base image of the second cycle.

In the above-described embodiment, the upper surface of the platen 5 is flat. In contrast to this, the upper surface of the platen 5 may be curved, for example. The platen 5 has a rectangular shape in a plan view. In contrast to this, a contour of the platen 5 may be formed as a shape in which curved portions are formed at the front end and the rear end thereof, for example. The platen 5 is not limited to the platen for printing the T-shirt, and may be a platen for printing a tag provided in a position at the neck of the T-shirt. Whichever of the platens is used, it is sufficient that the platen size is determined using the length of the platen in the front-rear direction, that is, using the length from the front end to the rear end of the platen.

In place of the CPU 41, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42, the flash memory 44, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or the flash memory 44. In this case, the control program may be stored in a non-transitory storage medium, such as an HDD provided in the server.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:

a head configured to perform printing on a print medium by discharging a liquid onto the print medium;

a platen configured to support the print medium;

a platen support member configured to support the platen;

a positioner configured to determine a position of the platen supported by the platen support member, wherein the positioner is formed either on the platen or on the platen support member and the positioner either touches the platen if formed on the platen support member and touches the platen support member if formed on the platen, and determines the position of the platen relative to the platen support member, a conveyer configured to convey the platen via the platen support member in a conveyance direction with respect to the head;

a processor; and a memory storing computer-readable instructions that, when executed by the processor, cause the processor to perform processes comprising:

acquisition processing of acquiring a platen size, the platen size being a size of the platen in the conveyance direction, a type of the platen including a first platen of a first platen size and a second platen of a second platen size smaller than the first platen size; and conveyance control processing that is processing to control a conveyance operation, the conveyance operation being an operation in which the conveyer conveys the platen supported by the platen support member between a set position of the print medium and a printing position, the set position being a position of the platen at which an attaching operation of attaching the print medium to the platen is performed, a position of the platen in the conveyance direction being predetermined by a position of the positioner, the printing position being a position in the conveyance direction at which a discharging of the liquid onto the print medium by the head is started, the conveyance control processing including controlling the conveyance operation such that, when the first platen size is acquired by the acquisition processing, a conveyance time period of the first platen by the conveyer between a first set position of the print medium and the printing position is a first time period, the first set position being a set position of the first platen at which the attaching operation to the first platen is performed, and controlling the conveyance operation such that, when the second platen size is acquired by the acquisition processing, a conveyance time period of the second platen by the conveyer between a second set position and the printing position is a second time period different from the first time period, the second set position being a set position of the second platen at which the attaching operation to the second platen is performed, wherein in the conveyance control processing, the computer-readable instructions stored in the memory further instruct the processor to perform processes comprising:

setting the first set position to a position at which, when the first platen size is acquired by the acquisition processing, a distance in the conveyance direction between the first set position and the printing position is a first distance, and setting the second set position to a position at which, when the second platen size is acquired by the acquisition processing, a distance in the conveyance direction between the second set position and the printing position is a second distance different from the first distance, and wherein a position of the positioner when the first platen is positioned at the first set position and a position of the positioner when the second platen is positioned at the second set position are different from each other in the conveyance direction.

2. The printer according to claim 1, wherein in the conveyance control processing, the computer-readable instructions stored in the memory further instruct the processor to perform a process comprising:

controlling the conveyance operation such that, when the second platen size is acquired by the acquisition processing, the conveyance time period of the second platen by the conveyer between the second set position and the printing position is the second time period shorter than the first time period.

3. The printer according to claim 1, wherein in the conveyance control processing, the computer-readable instructions stored in the memory further instruct the processor to perform a process comprising:

setting the second set position to a position at which, when the second platen size is acquired by the acquisition processing, the distance in the conveyance direction between the second set position and the printing position is the second distance shorter than the first distance.

4. The printer according to claim 1, wherein in the conveyance control processing, the computer-readable instructions stored in the memory further instruct the processor to perform processes comprising:

controlling the conveyance operation such that, when the first platen size is acquired by the acquisition processing, an average of a conveyance speed of the first platen by the conveyer between the first set position and the printing position is a first speed, and controlling the conveyance operation such that, when the second platen size is acquired by the acquisition processing, the average of the conveyance speed of the second platen by the conveyer between the second set position and the printing position is a second speed different from the first speed.

5. The printer according to claim 4, wherein the conveyer is configured to convey the platen, in the conveyance direction, between the first set position or the second set position and the printing position via a switching position, the switching position being a position at which an end of the platen in a direction from the printing position toward the first set position or the second set position positioned at the opening, and wherein in the conveyance control processing, the computer-readable instructions stored in the memory further instruct the processor to perform processes comprising:

controlling the conveyance operation such that, when the first platen size is acquired by the acquisition processing, an average of the conveyance speed of the first platen by the conveyer between the first set position and the switching position corresponding to the first platen size is a third speed slower than the first speed, and controlling the conveyance operation such that the average of the conveyance speed of the first platen by the conveyer between the switching position corresponding to the first platen size and the printing position is a fourth speed faster than the first speed; and controlling the conveyance operation such that, when the second platen size is acquired by the acquisition processing, the average of the conveyance speed of the second platen by the conveyer between the second set position and the switching position corresponding to the second platen size is a fifth speed slower than the second speed, and controlling the conveyance operation such that the average of the conveyance speed of the second platen by the conveyer between the switching position corresponding to the second platen size and the printing position is a sixth speed faster than the second speed.

6. The printer according to claim 1, wherein in the acquisition processing, the computer-readable instructions stored in the memory further instruct the processor to perform a process comprising:

acquiring the platen size from an image capture result by a camera.

7. The printer according to claim 1, wherein in the conveyance control processing, the computer-readable instructions stored in the memory further instruct the processor to perform processes comprising:

after conveying the platen from the first set position or the second set position to a predetermined return position, conveying the platen by the conveyer from the return position to the first set position or the second set position; and setting the return position to a position of the platen when an end of the platen in a direction from the printing position toward the first set position or the second set position is disposed at the printing position, in a region of the print medium at which an image is printed by the head.

8. The printer according to claim 1, wherein in the conveyance control processing, the computer-readable instructions stored in the memory further instruct the processor to perform processes comprising:

after conveying the platen from the first set position or the second set position via the printing position to a return position on an opposite side to the first set position or the second set position with respect to the printing position in the conveyance direction, conveying the platen by the conveyer from the return position to the first set position or the second set position via the printing position;

when the first platen size is acquired by the acquisition processing, setting, as the return position, a position at which a distance between the return position and the printing position in the conveyance direction is a third distance; and when the second platen size is acquired by the acquisition processing, setting, as the return position, a position at which a distance between the return position and the printing position in the conveyance direction is a fourth distance shorter than the third distance.

9. The printer according to claim 1, wherein in the conveyance control processing, the computer-readable instructions stored in the memory further instruct the processor to perform a process comprising:

starting the conveyance operation by causing the conveyer to convey the platen from the first set position or the second set position.

10. The printer according to claim 1, wherein in the conveyance control processing, the computer-readable instructions stored in the memory further instruct the processor to perform a process comprising:

ending the conveyance operation by causing the conveyer to stop the platen at the first set position or the second set position.

11. A control method of a printer, the control method comprising:

acquisition processing of acquiring a platen size, the platen size being a size in a conveyance direction, of a platen that supports a print medium, a type of the platen including a first platen of a first platen size and a second platen of a second platen size smaller than the first platen size; and conveyance control processing that is processing to control a conveyance operation of the platen via a platen support member, the platen support member configured to support the platen, in the conveyance direction the conveyance operation being an operation in which a conveyer conveys the platen supported by the platen support member between a set position of the print medium and a printing position, the set position being a position of the platen at which an attaching operation of attaching the print medium to the platen is performed, a position of the platen in the conveyance direction being predetermined by a position of a positioner, the positioner configured to determine a position of the platen supported by the platen support member, wherein the positioner is formed either on the platen or on the platen support member and the positioner either touches the platen if formed on the platen support member and touches the platen support member if formed on the platen, and determines the position of the platen relative to the platen support member, the printing position being a position in the conveyance direction at which a discharging of a liquid onto the print medium by a head is started, the conveyance control processing including controlling the conveyance operation such that, when the first platen size is acquired by the acquisition processing, a conveyance time period of the first platen by the conveyer between a first set position of the print medium and the printing position is a first time period, the first set position being a set position of the first platen at which the attaching operation to the first platen is performed, and controlling the conveyance operation such that, when the second platen size is acquired by the acquisition processing, a conveyance time period of the second platen by the conveyer between a second set position and the printing position is a second time period different from the first time period, the second set position being a set position of the second platen at which when the attaching operation to the second platen is performed, wherein the conveyance control processing includes:

setting the first set position to a position at which, when the first platen size is acquired by the acquisition processing, a distance in the conveyance direction between the first set position and the printing position is a first distance, and setting the second set position to a position at which, when the second platen size is acquired by the acquisition processing, a distance in the conveyance direction from the printing position is a second distance different between the second set position and the first distance, and wherein a position of the positioner when the first platen is positioned at the first set position and a position of the positioner when the second platen is positioned at the second set position are different from each other in the conveyance direction.

12. A non-transitory computer-readable medium storing computer-readable instructions that, when executed, cause a computer of a printer to perform processes comprising:

acquisition processing of acquiring a platen size, the platen size being a size, in a conveyance direction, of a platen that supports a print medium, a type of the platen including a first platen of a first platen size and a second platen of a second platen size smaller than the first platen size; and conveyance control processing that is processing to control a conveyance operation of the platen via a platen support member, the platen support member configured to support the platen, in the conveyance direction, the conveyance operation being an operation in which a conveyer conveys the platen supported by the platen support member between a set position of the print medium and a printing position, the set position being a position of the platen at which an attaching operation of attaching the print medium to the platen is performed, a position of the platen in the conveyance direction being predetermined by a position of a positioner, the positioner configured to determine a position of the platen supported by the platen support member, wherein the positioner is formed either on the platen or on the platen support member and the positioner either touches the platen if formed on the platen support member and touches the platen support member if formed on the platen, and determines the position of the platen relative to the platen support member, the printing position being a position in the conveyance direction at which a discharging of a liquid onto the print medium by a head is started the conveyance control processing including controlling the conveyance operation such that, when the first platen size is acquired by the acquisition processing, a conveyance time period of the first platen by the conveyer between a first set position of the print medium and the printing position is a first time period, the first set position being a set position of the first platen at which the attaching operation to the first platen is performed, and controlling the conveyance operation such that, when the second platen size is acquired by the acquisition processing, a conveyance time period of the second platen by the conveyer between a second set position and the printing position is a second time period different from the first time period, the second set position being a set position of the second platen at which when the attaching operation to the second platen is performed, wherein in the conveyance control processing, the computer-readable instructions stored in a memory further instruct a processor to perform processes comprising:

setting the first set position to a position at which, when the first platen size is acquired by the acquisition processing, a distance in the conveyance direction between the first set position and the printing position is a first distance, and setting the second set position to a position at which, when the second platen size is acquired by the acquisition processing, a distance in the conveyance direction from the printing position is a second distance different from the first distance, and wherein a position of the positioner when the first platen is positioned at the first set position and a position of the positioner when the second platen is positioned at the second set position are different from each other in the conveyance direction.

13. The printer according to claim 10, wherein the computer-readable instructions stored in the memory further instruct the processor to perform processes comprising:

printing processing of performing the printing by discharging the liquid onto the print medium in a state in where the first platen or the second platen is disposed at the printing position by the conveyance control processing, and after the printing processing, ending the conveyance operation by causing the conveyer to stop the first platen at the first set position or the second platen at the second set position.

* * * * *